United States Patent [19]

Rostkowski et al.

[11] Patent Number: 4,672,190
[45] Date of Patent: Jun. 9, 1987

[54] LINE FOLLOWING SYSTEM AND PROCESS WITH MATRIX GENERATING

[75] Inventors: Teresa Rostkowski, New Britain; Hava V. Zernik, Unionville; Joseph Sarcia, Tolland, all of Conn.; Richard L. Ginga, Southbridge, Mass.

[73] Assignee: The Gerber Scinetific Instrument Company, South Windsor, Conn.

[21] Appl. No.: 684,490

[22] Filed: Dec. 21, 1984

[51] Int. Cl.$^4$ .......................... G05B 1/00; G05B 19/19
[52] U.S. Cl. ..................................... 250/202; 318/577
[58] Field of Search ................. 250/200, 201, 202; 318/577; 382/8

[56] References Cited

U.S. PATENT DOCUMENTS

| | | | |
|---|---|---|---|
| 3,671,937 | 6/1972 | Takahashi et al. | 250/202 X |
| 4,319,331 | 3/1982 | Elbaum | 250/202 X |
| 4,321,682 | 3/1982 | Koshikowa | 250/202 X |
| 4,441,020 | 4/1984 | Sakamoto | 250/202 |
| 4,561,061 | 12/1985 | Sakamoto et al. | 250/202 X |
| 4,567,348 | 1/1986 | Smith et al. | 318/577 X |
| 4,613,749 | 9/1986 | Vali | 250/202 |

FOREIGN PATENT DOCUMENTS

| | | | |
|---|---|---|---|
| 0097786 | 6/1983 | Japan | 250/202 |
| WO85/00309 | 1/1985 | PCT Int'l Appl. | |

Primary Examiner—Eugene R. LaRoche
Assistant Examiner—David Mis
Attorney, Agent, or Firm—McCormick, Paulding & Huber

[57] ABSTRACT

A line following system comprising a matrix generating optical scanning device which produces a matrix representing a portion of a line being followed and a computer which locates points on said line from said matrixes and directs the optical scanning device to proceed along the line based on a course indicated by vectors between previously located points.

28 Claims, 17 Drawing Figures

LINE FOLLOWING SYSTEM AND PROCESS WITH MATRIX GENERATING

BACKGROUND OF THE INVENTION

The invention relates to line following systems, and deals more particularly with a line following system utilizing an optical scanning device to generate matrix representations of portions of a line being followed and a computing means for analyzing information contained in said matrix representations to direct the movement of the optical scanning device along the course of the line and to make a digital representation of the line.

Line followers are frequently used to digitize design drawings of automobiles, mechanical structures, or other objects which have features subject to creative design. Although these designs may originate from the efforts of a person drawing with a mechanical drafting instrument on a sheet of paper, it is a common practice in the design of objects such as described above for the hand-written drawings to be translated into computer language, stored in a computer, made available for display on a monitor, and from then on, be subject to additions and alterations in the course of a redesign of the object. Such a redesigning process, sometimes called computer aided design, is especially advantageous when changes are required for a relatively small portion of the drawing in which case, only that portion of the drawing need be redrafted. Without a computer aided design system, a draftsperson may be required to redraft the entire drawing, copying or tracing the unchanged sections and altering the section to be redesigned, this latter approach consuming much more time than the computer aided design one.

Also with a computer aided design system such as may utilize digital representations produced by the present invention of two or more views of an object, it may be possible, for a computer to generate a digital representation of another view of the object for displaying or editing purposes.

A line following system is disclosed in U.S. Pat. No. 3,529,084 to Rich in which system a vidicon tube produces a circular scan around a portion of a line being followed, and each time the scan crosses the line, the vidicon tube produces a pulse. If the circular scan is centered directly over a portion of the line, the vidicon tube will produce pulses which are equally spaced in time, and if the circular scan is centered somewhat off the line, the vidicon tube will produce pairs of pulses, which pulses of a given pair are spaced closer to one another than to a previous or subsequent pulse, the more off center the vidicon tube, the more the pulses of a given pair are separated from the previous or subsequent pulse. The pulsed output of the vidicon tube is applied to a pulse phase comparator which develops an error signal representative of the deviation of the temporal spacing of the pulses from an equally spaced configuration of a reference pulse train. The error signal is applied to a variable frequency oscillator which produces a correction signal which it sends to two coordinate drive motors. In response, the motors move the vidicon tube closer to and along the line.

There are also know systems for digitizing a graphic inscription such as typing on a page for a purpose of transmitting a digital representation of the inscription over a telephone line or other data communication line. One such system bears the trade name FAX and it is presumed that such a system does not "follow" particular typed letters or other graphic inscriptions on the page but rather scans across the page, row by row, and senses inscribed points or segments within each row. As the inscriptions are scanned, they are digitized in one form or other, and such digitizations may be transmitted over a telephone line by means of a modem. Such a system may utilize a form of digitization commonly known as Run-Length-Encoding in which every pixel of a given row is not digitized, but rather a series of "run" numbers and "length" numbers are used to digitize inscriptions within or crossing each row. The run number indicates the number of blank pixels preceding a given mark or graphic inscription in the row and the length number indicates the length of the given mark or inscription within the row. For each scanned line, there are as many pairs of run and length numbers as there are distinct marks or graphic inscriptions in the row. The advantage of the Run-Length-Encoding system is that generally fewer bytes of digital information are needed to represent a graphic inscription on a page, and this savings shortens the time that is needed to transmit such a digital representation over a telephone line because telephone lines provide a relatively slow rate of data transfer. One or more systems of Run-Length-Encoding have also been developed in conjunction with research of a video telephone although the details are not presently known to the Applicants.

A general aim of the invention is to provide a line following system which can follow a line at a relatively high rate of speed and produce an accurate representation of the line.

Another general aim of the invention is to provide a line following system which is substantially automatic in operation.

A more specific aim of the invention is to provide a line following system which utilizes an optical scanning device to produce information corresponding to matrixes, each representing a portion of a line being followed.

Another specific aim of the invention is to provide a line following system which can follow a distorted line, one having small irregularities or gaps which may be caused by an appreciable age or usage of a sheet upon which the line is inscribed.

A still further aim of the invention is to provide a line following system which can negotiate relatively sharp turns of a line being followed without intervention by an operator.

Yet another aim of the invention is to provide a line following system in which selected portions of a graphic source material can be displayed on a monitor along with a representation of portions of the graphic source material which already have been followed and digitized, said representation being superimposed or otherwise indicated on the respective portions of the line.

SUMMARY OF THE INVENTION

The invention resides in a line following system comprising a matrix yielding or generating, optical scanning device which produces information corresponding to a matrix representing a portion of a line to be followed, and a computing means for producing a digital representation of said matrix and directing movement of the optical scanning device along the line based on information contained in said matrix or said digital representation.

According to specific features of the invention, the computing means determines points on said line from information contained in said digital representation and causes the optical scanning device to advance in a direction calculated from information as to the location of two or more previously determined points, said direction being along the line. In addition, once the computing means has generated a representation of a portion or all of the line, the representation can be displayed on a video monitor superimposed on a video image of the line to inform an operator which portions of the line have yet to be followed and digitized.

BRIEF DESCRIPTIONS OF THE DRAWINGS

Figure 1:
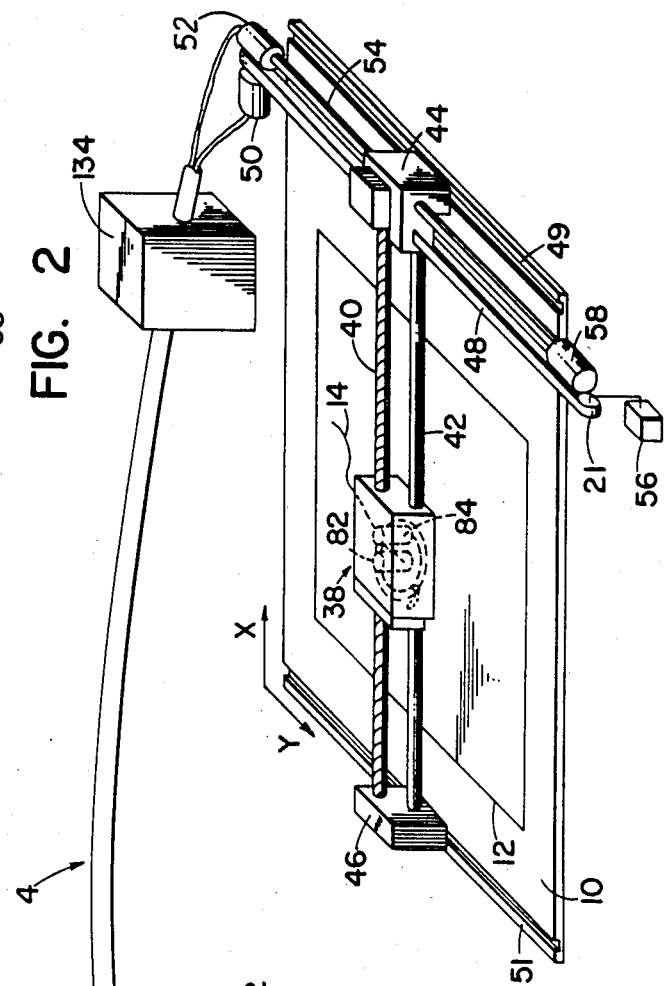
FIG. 1 is a perspective view of a line following system embodying the present invention.
Figure 1:
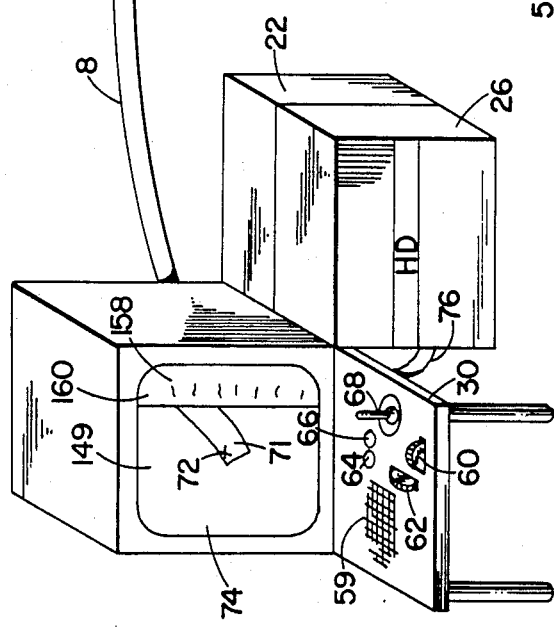
Figure 14:
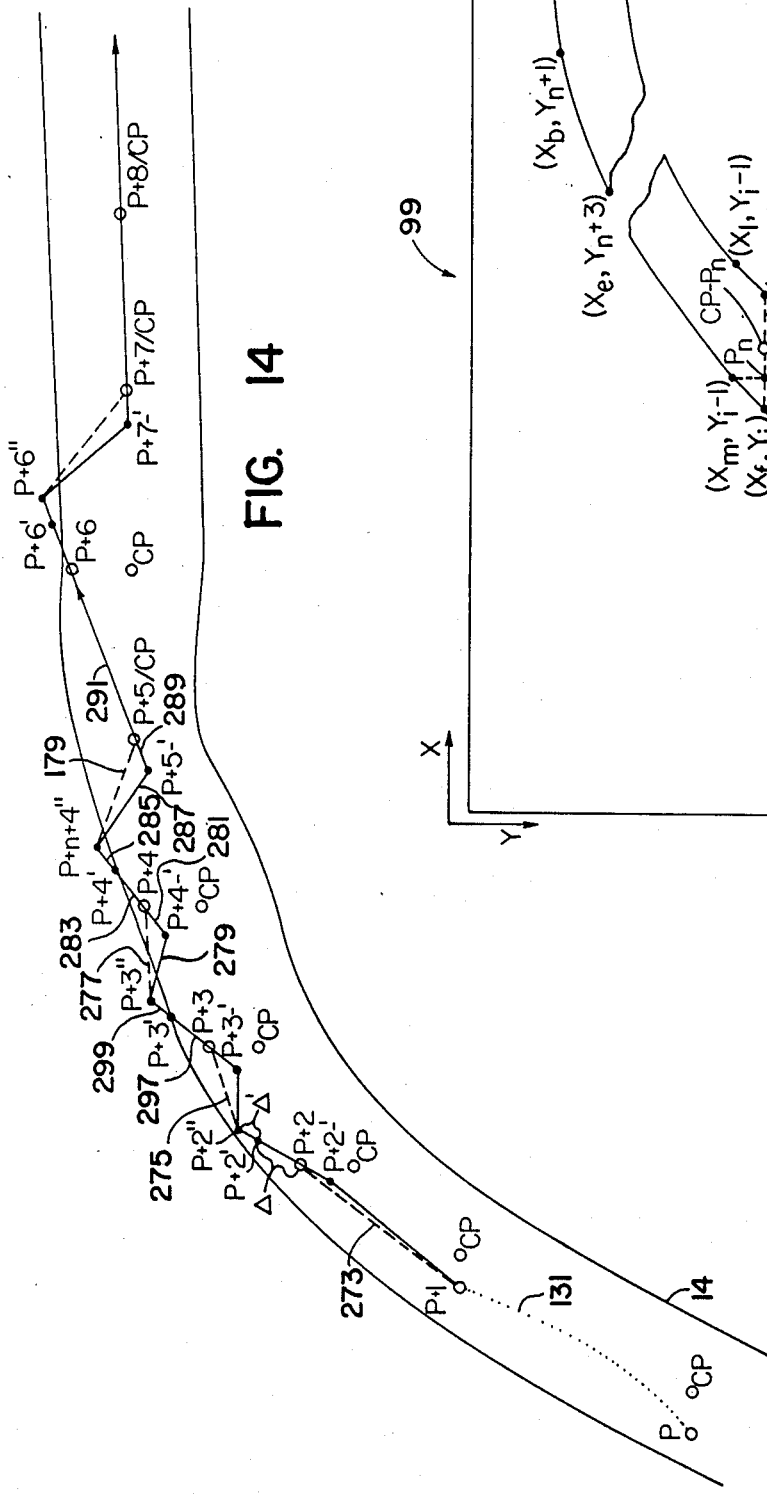

FIG. 14 indicates the motion of an optical scanning device used in the line following system of FIG. 1 as said optical scanning device follows a line.

Figure 15:
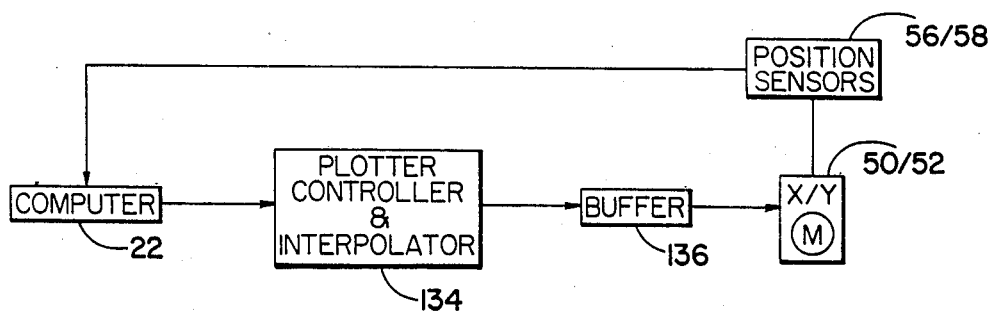

FIG. 15 is a block diagram of components of the line following system of FIG. 1 involved in moving an optical scanning device along a line.

Figure 16:
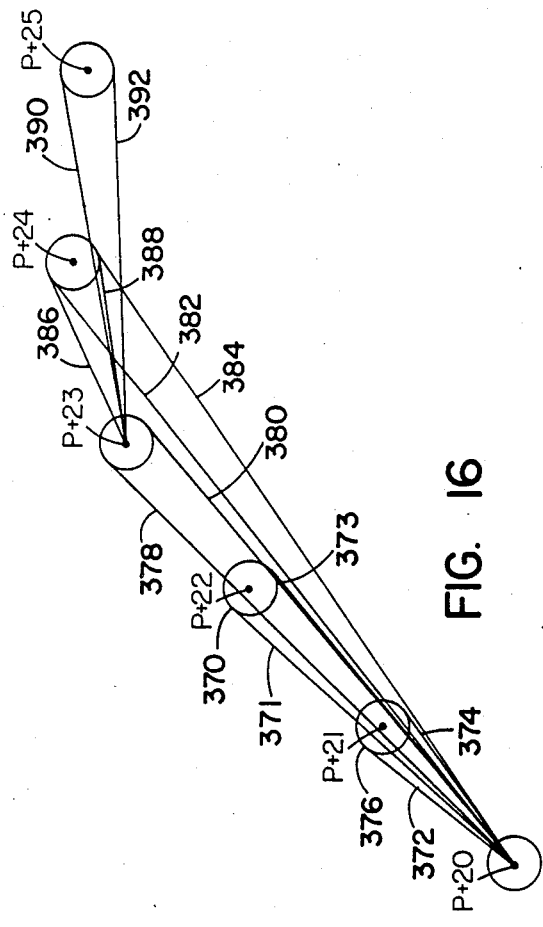

FIG. 16 illustrates a thinning process utilized in the line following system of FIG. 1 to ascertain which if any previously digitized points or a line being followed are not necessary to adequately plot the line being followed.

Figure 17:
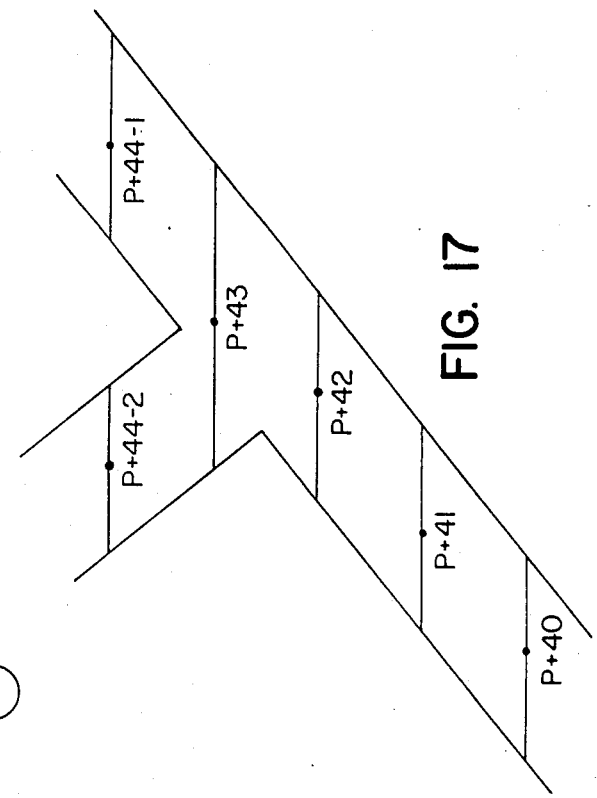

FIG. 17 illustrates a portion of a line being followed and a process by which a line following system may select a fork of a line to follow at an intersection.

DESCRIPTION OF THE PREFERRED EMBODIMENT

Turning now to the drawings, FIG. 1 shows a line following system generally indicated at 4 embodying the present invention. The system includes a table 10 for supporting a source of graphic material such as sheet 12 having a line 14 inscribed thereon to be followed, an optical scanning head 38 which is supported above the table 10 for movement in a plane generally parallel thereto, a computer 22, a memory storage device 26 for the computer 22, a video monitor 34 and a console 30 for the computer and the monitor.

The scanning head 38 is movable in one coordinate direction, referred to as the X axis relative to the table 10 by a drive system including a lead screw 40, a guide bar 42, carriages 44 and 46, a spline shaft 54, and a drive motor 52. The scanning head is also movable in a second coordinate direction, referred to as the Y axis relative to the table 10 by means of a second drive system including a drive belt 48, a pulley 21, guides 49 and 51, the carriages 44 and 46, and a drive motor 50. The angular positions of the pulley 21 and the spline shaft 54 represent the position of the scanning head 38 relative to the table 10, and are sensed by position sensors 56 and 58 respectively to produce position signals which are transmitted to the computer 22 for use in a digitizing function of the line following system 4. For a further description of an apparatus for moving a scanning head in a plane generally parallel to a flat surface reference may be made to U.S. Pat. No. 3,529,084 to Rich which issued on Sept. 15, 1970 and is assigned to the assignee of the present invention and hereby incorporated by reference as part of the present disclosure.

The computer 22 may comprise a standard computer such as, by way of example, a Motorola CPU model VME110, and appropriate software described in detail below. The console 30 comprises a keyboard 59, a thumbwheel 60 for moving the scanning head 38 in the X direction relative to the table, a thumbwheel 62 for moving the scanning head 38 in the Y direction relative to the table, a push button 64 to signal the computer to digitize a point indicated by a cursor 72 on the monitor 34, a push button 66 to signal the computer to automatically advance the scanning head 38 along the line 14, and a joystick or an omni directional control 68 for manually directing movement of the scanning head 38. Other suitable controls may be substituted for the keyboard 59, push buttons 64 and 66, thumbwheels 60 and 62, and joystick 68, to accomplish the movement of the scanning head 38 described above. As the scanning head 38 is moved by means of the various controls on console 30, different portions of the line 14 can be displayed in various positions on the monitor 34. Typically, gross movements of the scanning head 38 are accomplished by means of the joysticks 68 and such movements may be used to position a certain portion of a target such as end portion 71 somewhere on the monitor, and then the end portion 71 or other desired target may be precisely positioned by means of thumbwheels 60 and 62 so that the computer 22 may perform a function related to the portion of the target displayed or the point identified by the cursor 72. It is also possible by means of the keyboard 59 on the console 30 to enter coordinates of a point on sheet 12 and so to direct the movement of scanning head 38 to a position where it views a desired portion of the target.

As line 14 is being followed and digitized, the computer may output a digital representation of the line 14 to the hard disc unit 26 which is one type of memory device which may be used in the line following system 4, and communicates with the disc unit by means of a cable 76.

Figure 2:
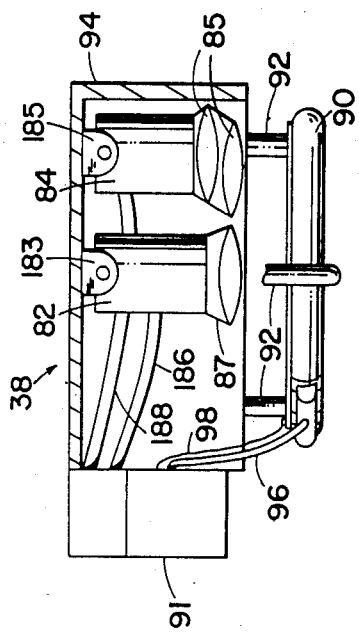
FIG. 2 is an enlarged schematic diagram of an optical scanning head within the line following system of FIG. 1.

FIG. 2 is an enlarged schematic view of the optical scanning head 38 and illustrates a high resolution camera 82 and a low resolution camera 84 having fields 86 and 88 respectively which are centered at a common point. The cameras each have a viewing axis aimed at the common center point, and the low resolution camera 84 is focused and aimed by lens assembly 85 which is part of the camera 84 and the high resolution camera is focussed by lens 87. By way of example, the dimensions of the high resolution field may be $\frac{1}{2}"$ by $\frac{1}{2}"$ and the dimensions of the low resolution field may be 4" by 4". Communication with the cameras 82 and 84 is made through cables 86 and 88, respectively, which interconnect with the computer 22 in any known fashion.

Beneath the cameras 82 and 84 is a lamp 90 which provides a source of flashing light which strobes the target areas 86 and 88 as the scanning head 38 moves along the line and the cameras generate images of the line 14 so that the images produced by the cameras are not blurred. This is especially important in one embodiment of the invention wherein the scanning head does not stop at some points where images are generated. The type of flashing lamp utilized in the line following system 4 is not central to the present invention and may, by way of example, comprise a toroidal fluorescent lamp 90 having an ionization electrode 33, the lamp and electrode being driven by an electronic unit 91. Such a flashing fluorescent lamp unit is further described in co-pending application, Ser. No. 684,491, filed by Henry F. Berdat concurrently herewith and assigned to the same assignee of the present invention, and hereby incorporated by reference as part of the present disclosure. However, if desired a standard Xenon lamp or group of such lamps operated in a standard flashing mode may be used instead of the fluorescent lamp 90 shown in FIG. 2. The lamp 90 is supported by force-fitting clamps 92, 92 beneath a housing 94 of the optical scanning head 38 and the lamp 90 receives its drive signals via cables 96 and 98. The lamp 90 provides a substantially uniform source of light when it flashes, and the cameras 82 and 84 are supported by brackets 183 and 185 respectively such that the cameras peer through the center space of the lamp. If a plurality of spherical Xenon lamps are used instead of the fluorescent lamp 40, they can be arranged in a circle defined by the toroidal lamp 90.

Figure 3:
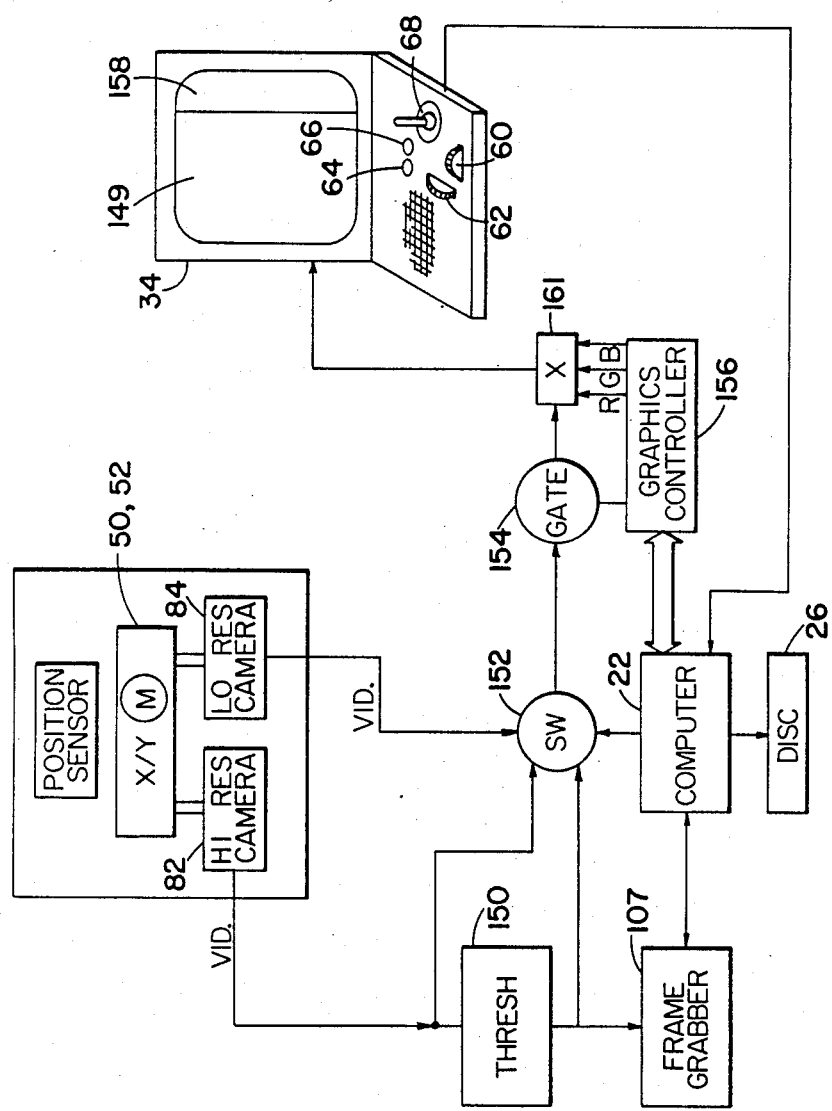
FIG. 3 is a schematic block diagram of the line following system of FIG. 1.

FIG. 3 is a block diagram of various units of the line following system 4 and shows a schematic representation of paths of communication between the units. As shown, video signals are sent by the high resolution camera 82 to a threshold detector 150 which includes a comparator 110 (shown in FIG. 7), and the output of the threshold detector is sent to a three-position switch 152 and to a frame-grabber circuit 107 which may be considered part of a computing means of the line following system 4. In addition, a video signal from the low resolution camera 84 and a video signal from the high resolution camera 82 are sent directly to the switch 152 which passes one of these three signals, as selected by an operator via the console 30 and computer 22, to a windowing gate 154. The windowing gate is controlled by a graphics controller 156 which communicates with and is controlled by the computer 22 and the windowing gate defines a region 149 on the monitor 34 where the video and other information relating to a portion of a line which has been digitized is displayed, and another region 160 where a menu 158 is displayed.

The computer 22 receives from the frame-grabber 107 translations of video matrixes produced by the high resolution camera 82 to represent an image of the line 14, and the computer periodically sends information as to coordinates of points which plot the line 14 to the hard disc unit 26 for storage, said coordinates being calculated from information derived from the matrix translations. A suitable high resolution camera may generate a matrix of approximately 250 columns and 400 rows of pixels although the precise number of columns and rows of pixels is not critical to the present invention. The graphics controller 126 generates menu information 158 which is displayed along side the video signal which passes through the switch 152 and gate 154 and other information which passes from the computer through the graphics controller 160 and is combined with the video in a super-positioning manner by mixer 161.

Figure 4:
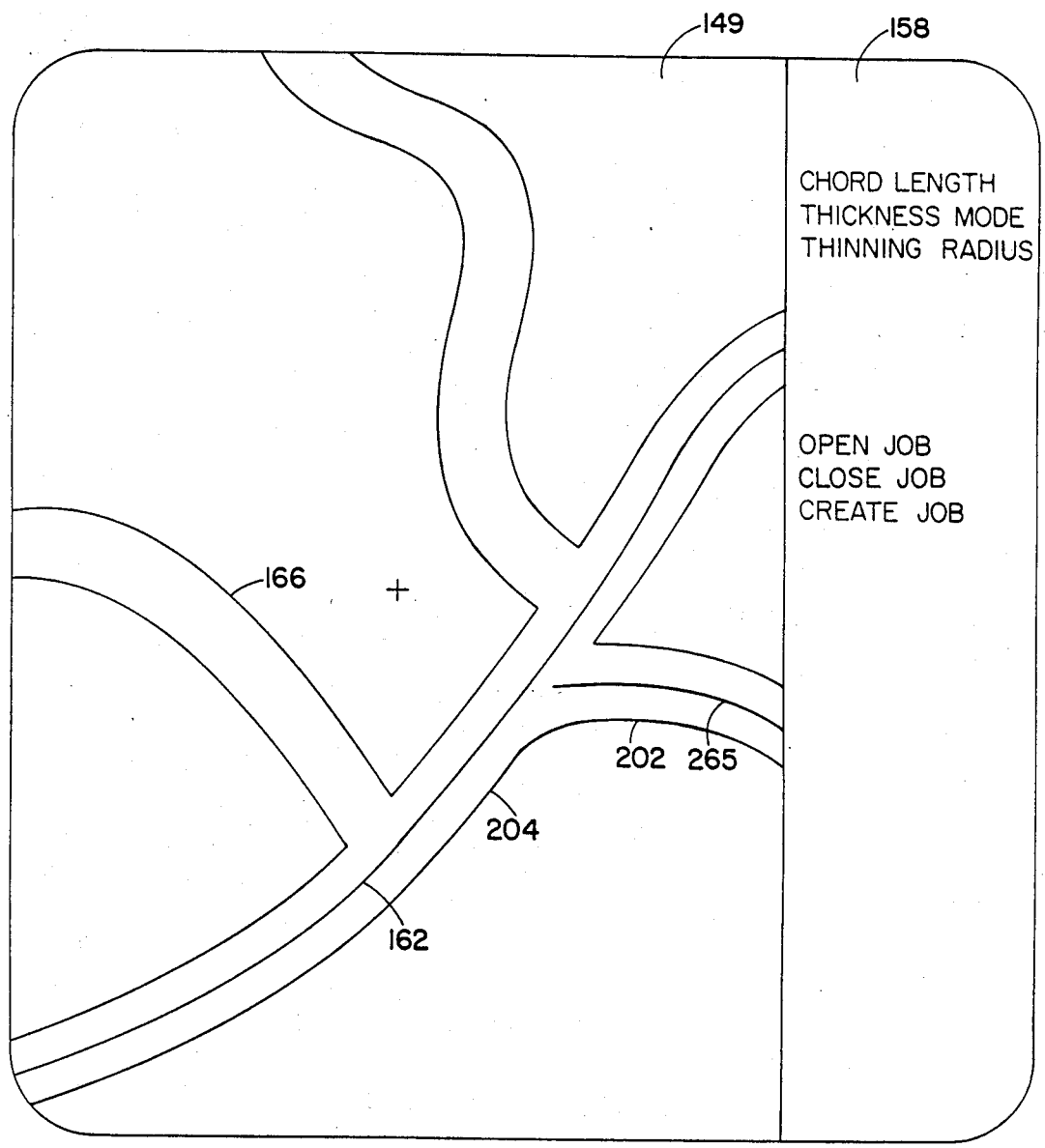
FIG. 4 is a diagram of an image displayed on a monitor within the line following system of FIG. 1.

The menu information more clearly shown in a region 158 of FIG. 4 may include a variety of information such as a chord length to indicate a desired spacing between points on a line to be digitized, tolerance information used in a subsequent thinning operation to reduce the number of such digitized points stored in disc memory necessary to plot the line being scanned, information as to a standard thickness assigned to the line being digitized, and routine information such as involved in opening, closing, or creating files and assigning names to them.

Also shown in FIG. 3, are three communication lines connected between the graphics controller and the mixer unit 161, one line for each of three video color signals. When desired by an operator, the operator, by means of the keyboard 59, can direct the line following system 4 to display a skeletal representation of portions of a line displayed on the monitor 34 which have been digitized, the skeleton being superimposed on a video image of said portion of the line, an example of which is shown in FIG. 4 by skeletal lines 162 and 265 which are superimposed on portions of a line 166. The computer produces such a skeleton by generating segments of straight lines which pass from point to point along a sequence of points which have been digitized. One of the video colors may be chosen for the video image of the line being followed and another color chosen for the skeleton so that the image of the line being followed and the skeleton stand out from one another. An operator can use this superimposed image to determine which portions of a line being followed have yet to be digitized and to direct the line following system 4 to proceed to digitize these portions.

Figure 5:
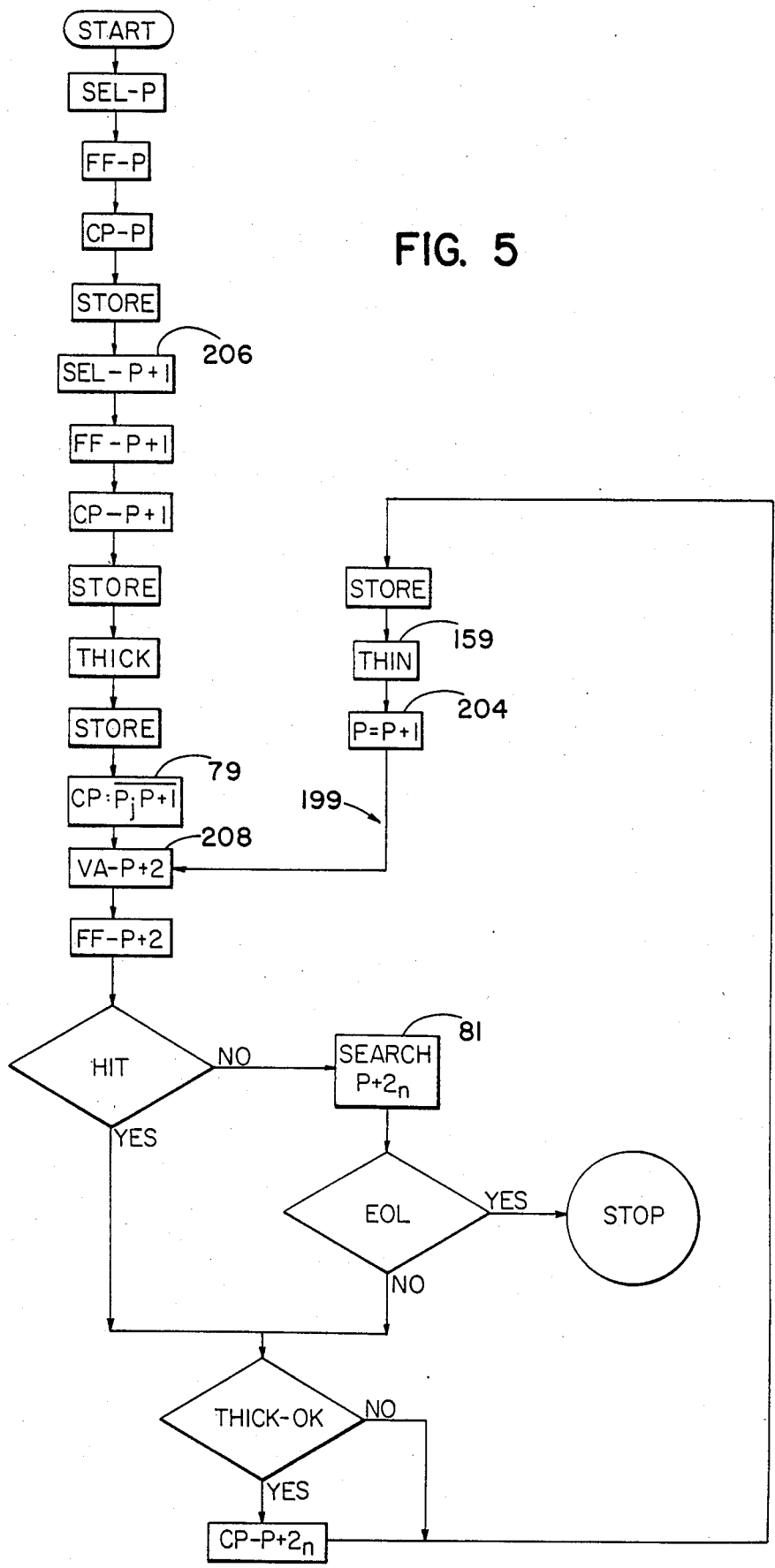
FIG. 5 is a flow chart representing one mode of operating the line following system of FIG. 1.

FIG. 5 is a flow chart demonstrating one process for following the line 14 or other lines which may be performed by the line following system 4. The low resolution camera 84 is typically used by an operator to position an image of a portion of the line 14 on the monitor 34 because the low resolution camera 84 views a relatively large field 88 and this makes it relatively easy for the operator to locate the desired portion of the monitor by appropriate movement of the scanning head 38. Preferably at this stage, the operator positions the portion as near as possible to the cursor 72. Then, the operator may switch on the video from the high resolution camera, thresholded if desired, and position the scanning head 38 so that the cursor is located over the portion 71 as shown in FIG. 1. This step of the process is labeled SEL-P in FIG. 5 which stands for the selection of a point P. Then, the operator may depress the digitize button 64 to direct the computer 22 to freeze a frame and store a matrix representation of the image displayed on the screen which is centered about point P and this step is further identified in the drawing as FF-P. Also, in response to the pressing of the digitize button 64, the computer proceeds to locate a center point of the line 14 near the point P, and this step is identified as CP-P. Then the computer stores a binary representation of the location of the center point adjacent point P.

Next, the operator may locate another point P+1 on the line 14 by appropriate movement of the thumbwheels 60 and 62, and by means of the digitize button 64, direct the computer to generate and freeze a frame of the image centered about the point P+1, calculate the location of a center point on the line 14 adjacent point P+1 and store a digital representation of the location of this center point. The point P+1 is identified within FIG. 5 and shown in FIG. 11. Next, the computer is instructed to calculate the thickness of the line 14 in a region about the point P+1 and store the result. The process for calculating the thickness of the line 14 in the vicinity of point P+1 is described below.

Figure 11:
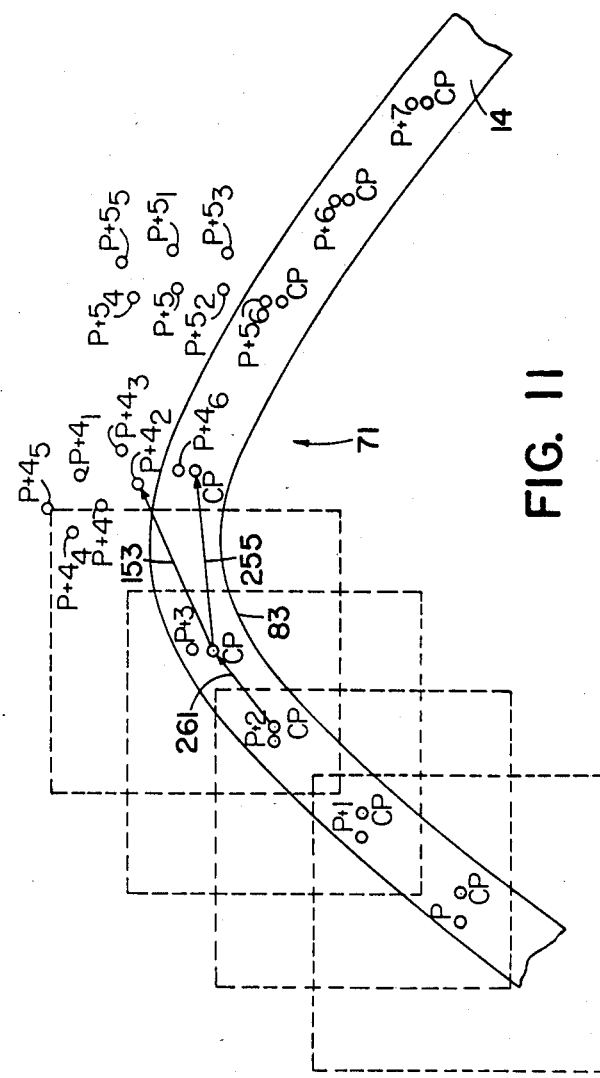
FIG. 11 illustrates a process used in the line following system of FIG. 1 for determining a sequence of points which generally follow the course of a line being followed and respective center points on said line.

Besides allowing the computer 22 to digitize two points on the line 14, the first two points P and P+1 which may be seen in FIG. 11, inform the computer which way the operator wants the computer to proceed along the line 14 in a subsequent vector advance mode which is usually automatic once activated. Typically, the first two points P and P+1 are selected manually by an operator by appropriate movement of the joystick 68 or thumbwheels 60 or 62, however, other automatic or semi-automatic means may be utilized to accomplish the same function. For example, two points may also be selected by means of previously stored information such as on magnetic tape or disc, or coordinates of such starting points may be input to the computer 22 via the keyboard 59.

The automatic vector advance mode, labeled VA-P+2 in FIG. 5, is initiated when an operator presses the vector advance button 66 which signals the computer 22 to compute a vector from point P to point P+1 as indicated by a step 79 and direct the scanning head 38 to move in the direction of the vector by sending appropriate signals to the X-Y motors 50 and 52. After the scanning head 38 has moved a certain "chord" distance previously selected by the operator by means of commands sent to the computer 22 through console 30, the field of the high resolution camera is centered about a point P+2 and an image of said point is displayed directly under the cursor 72 on the monitor 34 although in one embodiment of the invention the scanning head 38 does not stop there. Next, the computer automatically generates and stores a digital representation of a frame of an image made by the camera 82 when centered about point P+2, and the computer 22 determines whether point P+2 falls on or "hits38 the line 14. Since the point P+2 hits the line, the computer determines the thickness of the line near the point P+2. If the thickness is within a preselected tolerance range, the computer 22 calculates a center point adjacent the point P+2 and stores the coordinates of the center point. Then, the computer performs a thinning calculation to see if the previously stored point, point P+1 in the present case, is necessary to adequately plot the line, and if not, deletes the coordinates of the point P+1 from memory. Then the line following system 4 repeats the steps indicated by the loop 199 in FIG. 5 this time, however, proceeding toward a part P+3 and when the loop corresponding to point P+3 is completed, the computer automatically directs the scanning head 38 to point P+4. Note that the scanning head does not wait at points P+2 or P+3 while above described calculations are made.

Since the point P+4 shown in FIG. 11 does not hit the line 14, the computer 22 will perform a search operation 81 to determine if other points identified as $P+4_n$ near point P+4 fall on the line 14. Since the optical scanning head 38 is not yet to the end of the line (EOL), one such point $P+4_6$ falls on line 14. If the computer 22 could not find a point $P+4_n$ which falls on the line, as is the case with point P+Y in FIG. 13, this usually indicates that the computer has reached the end of the line or that there is a large gap in the line and in either case, the computer stops the motion of the scanning head 38 and asks the operator what to do next. In the instant case, the computer next calculates the thickness of the line about the point $P+4_6$ and if the thickness is within a predetermined range relative to the standard thickness of the line 14 previously calculated in the region of point P+1, the computer calculates a center point on the line 14 adjacent the point $P+4_6$ and stores its coordinates. If the thickness is not within the range, the computer does not perform a center point calculation and instead, for reasons discussed later, treats the point $P+4_6$ as if it were the center point of the line 14 and stores it. Then, the computer performs a thinning operation to determine if the previously determined point, in this case the center point adjacent point P+3, is necessary to plot the line 14. For example, if the center points adjacent points P+2, P+3, and P+4 were to lie in a segment of an approximately straight line, only the end points are needed to plot the corresponding portion of the line 14 and so, a memory of the point P+3 may be expunged.

After this thinning step, the computer automatically directs the scanning head 13 to move to another point identified as point P+5 and shown in FIG. 11 which is in a direction determined by a vector between the center point adjacent point P+3 or P+2 if P+3 was expunged from memory and the center point adjacent point $P+4_6$, and at a distance from the center point adjacent $P+4_6$ equal to the preselected chord length. This automatic vector advance mode may continue until an operator commands the computer to stop by way of a control on console 30, or until the scanning head 38 reaches the end of a line or a large gap in the line. Meanwhile, the line following system 4 continues to digitize the line 14.

Figure 6:
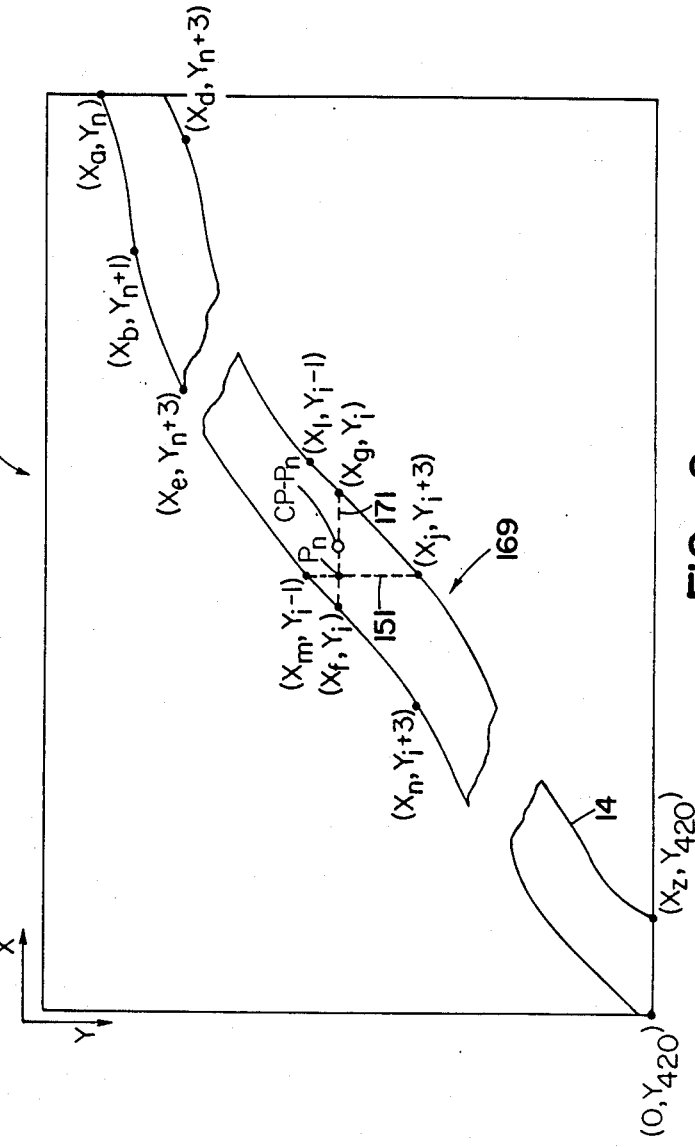
FIG. 6 is an illustration of a portion of a line being followed and specific points on said portion of the line have been identified by X-Y coordinates.
Figure 7:
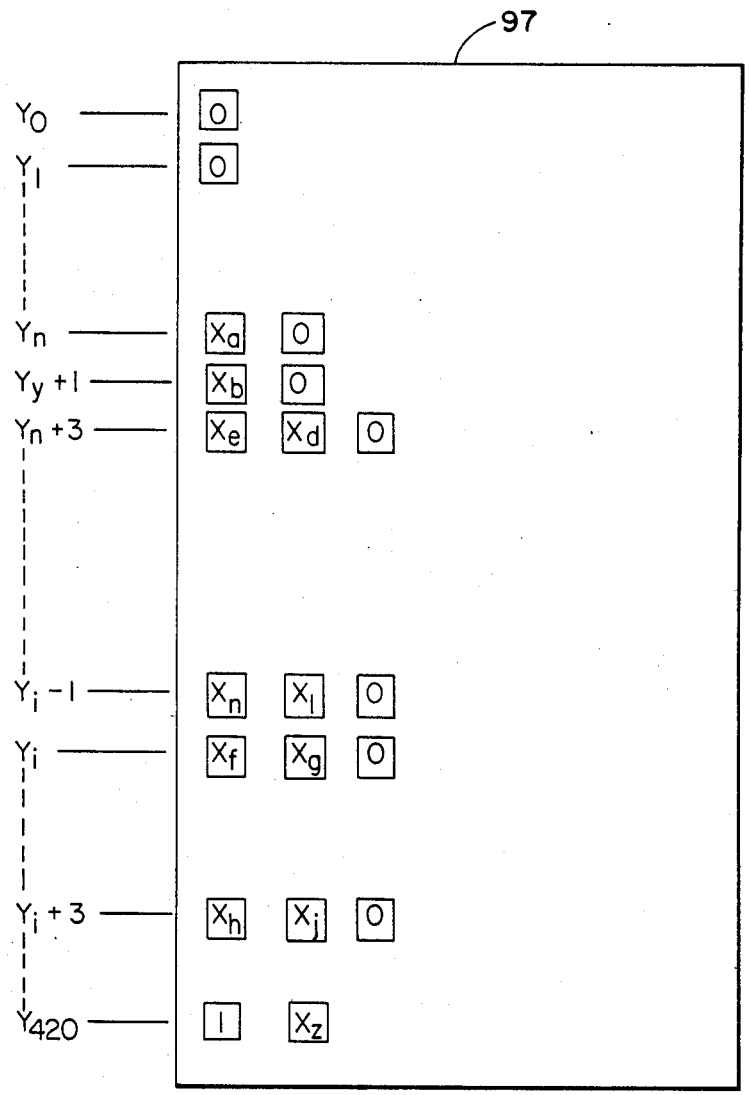
FIG. 7 is a schematic diagram of a digital matrix generated by a computer within the line following system of FIG. 1 representing the portion of the line shown in FIG. 6.

FIG. 6 shows a frame 99 produced by the high resolution camera 82 of a portion of the line 14 centered about point P and in the figure, selected points have been identified by their respective X-Y coordinates. FIG. 7 illustrates a matrix 97 developed within the computer 22 to represent the frame of FIG. 6 and has rows identified as $Y_0$ through $Y_{420}$ which correspond to 420 rows of the field 86 shown by the frame 99. However, it should be understood that the matrix 47 need not contain a row for every row of pixels of the high resolution camera 82. It may, for example, include a row for every two rows of pixels of the camera if desired, and a high resolution camera may be utilized which has more or fewer than 420 rows, in which case a corresponding number of rows may be used in the matrix of FIG. 7. In each row is a number or series of numbers which represent the location of transitions of the image in each corresponding row of the field of the camera. For example, assuming the line 14 is black and inscribed on a white sheet, there is a transition in a given row of the matrix 97 corresponding to the row in the field of the camera 82 where the image of the sheet changes from white to black or from black to white and this corresponds to regions where the line 14 crosses the given row in the field of the camera. Since the line 14 does not intersect any of the rows $Y_0$ through $Y_{n-1}$ in the field 86 there are no transition entries in the corresponding rows of the matrix of FIG. 7, and the numeral "0" is written by the computer in the first position within each row $Y_0$ through $Y_{n-1}$. The line 14 intersects row $Y_n$ at a point having coordinates $(X_a, Y_n)$ so that a transition occurs in row $Y_n$ at X position $X_a$, and consequently, the numeral $X_a$ is written in the first position in row $Y_n$. In the second position of row $Y_n$, the numeral "0" is written to indicate that the previous transition $X_a$ was the last one to occur in row $Y_n$.

The computer is further programmed to interpret a first non-zero number entered in any row of the matrix as the X-coordinate location in a corresponding row of the field 86 of the camera where the image has just made a transition from white to black or is black if the number happens to be "1" as in the case in row $Y_{420}$ where the line 14 emanates from the left-hand corner of the field. The computer is also programmed to interpret a second non-zero entry in a given run as the location of a black to white transition. The frame 99 illustrates a white to black transition at $X_b$ in row $Y_{n+1}$ a white to black transition at $X_e$ and a black to white transition at $X_d$, and such is indicated by the numbers entered in the rows $Y_{n+1}$ and $Y_{n+3}$ of the matrix of FIG. 7. As indicated above, the type of transition, whether white to black or black to white is indicated by the order of the entries in a particular row, and in any row, a non-zero entry in an odd position indicates a white to black transition (or location of a black point if the point has X-coordinate location 1) and each non-zero entry in an even position of a row indicates a black to white transition, and the "0" entry following the non-zero entries indicates an absence of any further transitions or entries a given row.

Figure 8:
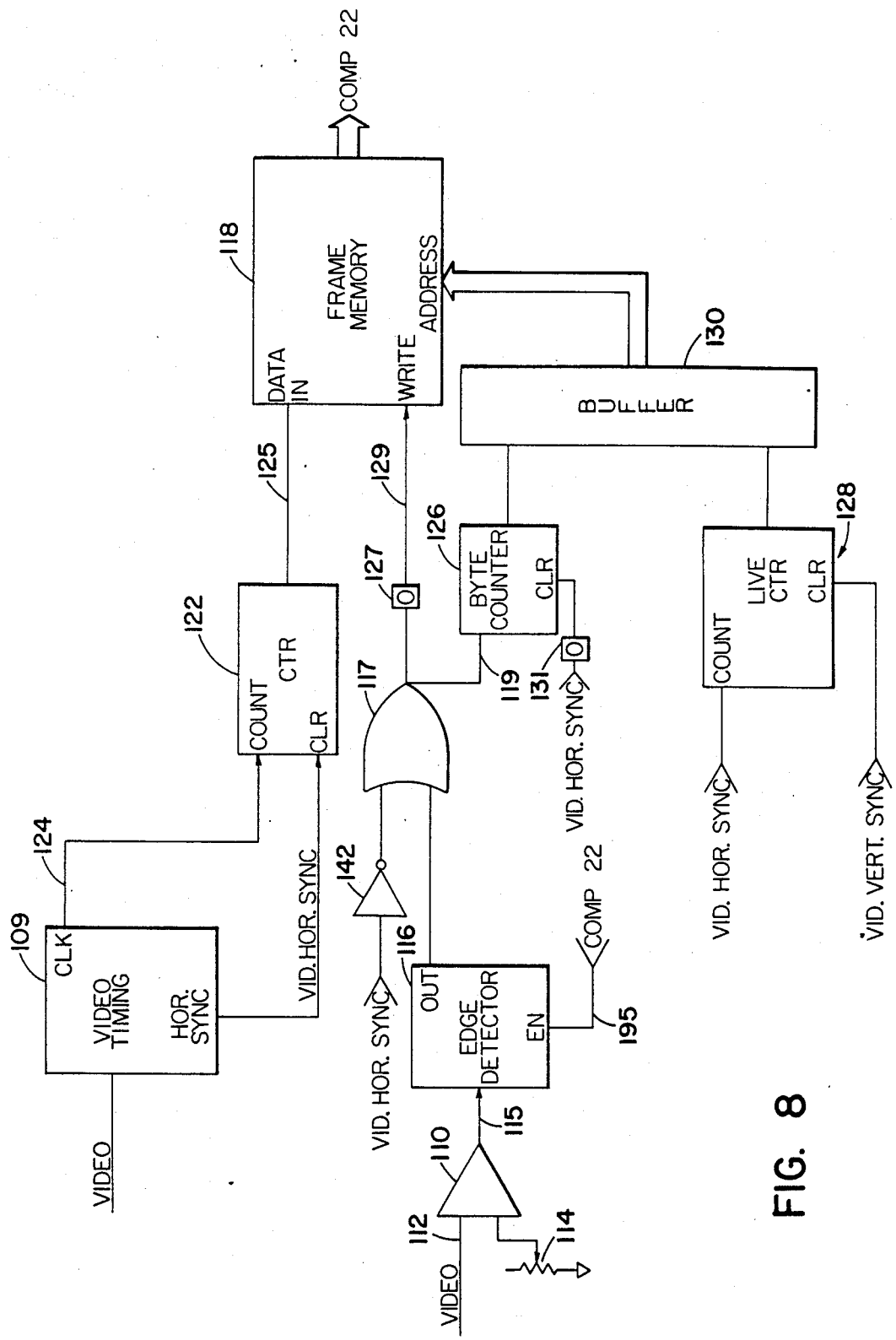
FIG. 8 shows a block diagram of a portion of the line following system of FIG. 1 used for generating a matrix such as shown in FIG. 7.

FIG. 8 is a block diagram of the frame-grabbing circuitry 107 and the threshold circuitry 150 within the line following system 4 which translates video signals produced by the camera 82 into the matrix of FIG. 7. The video signals may be of the standard type which include an invented horizontal sync pulse at the start of each segment of a video signal corresponding to the beginning of each row of the field 86 and a vertical sync pulse indicating the end of a frame. The threshold circuitry 150 of FIG. 8 includes a comparator 110 which receives a video signal at an input 112 from the camera 82 and compares it to a threshold voltage established by a potentiometer 114 so that a digital signal is produced at the output of the comparator indicative of whether the input from the video is below or above the threshold level. The threshold level is set at a level between the voltage of a video signal corresponding to a blank portion of the sheet and the voltage of a video signal corresponding to a portion of the sheet where to line 14 is inscribed. The desired setting of the potentiometer may depend on such factors as the darkness of the line 14, the darkness level of background marks on the sheet such as smudges, coffee spills, or incomplete erasures, and the potentiometer 114 should be set such that the threshold is above video signals corresponding to such background marks. Although the schematic diagram of FIG. 8 indicates that a potentiometer is used to set a threshold level for the comparator 110, other types of controls may be utilized. For example, a threshold level can be entered into the computer 22 via the keyboard 59, the computer being programmed to generate a voltage proportional to the keyboard entry and to apply this voltage to the comparator 110 instead of the voltage by the potentiometer 114.

The digital signal produced by the comparator 110 is fed to a trigger input 115 of an edge detector 116 which senses when the thresholded video signal has made a white to black transition or a black to white transition and delivers a pulse to a write input 129 of frame memory 118 via an OR Gate 117 and a delay 127. The edge detector 116 is enabled at an input 195 by an appropriate signal from the computer when the computer wants to generate a matrix of the type shown in FIG. 7 such matrixes are typically generated at each projected point such as points P+2 and P+3 shown in FIG. 14.

Simultaneous with the delivery of video information to comparator 110 and the response of edge detector 116, a pixel counter 122, which was cleared by the previous inverted horizontal sync pulse of the video signal 112, is repeatedly incremented by pulses produced by a clock output 124 of a video timing circuit 109 which produces a pulse for each portion of the video signal corresponding to one pixel in a given row of the matrix of pixels in the camera 82. The pixel counter 122 outputs to a data input 125 of the frame memory 118 and since the pulses produced by the edge detector 116 output to the write input 129, when the edge detector 116 senses a transition it causes the frame memory 118 to write the X-coordinate location of the transition produced by the pixel counter 122 into memory. Such an X-coordinate location number may be the $X_a$, $X_b$, $X_d$, $X_e$, or other entry in the matrix of FIG. 7. The delay 127 may be of the order of 50 nanoseconds and is used to delay the write signal to the frame memory so that the counter 122 has time to complete a current count before the frame memory 118 reads the count otherwise an unpredictable race condition may result.

Besides the X-coordinate location of each transition, the frame memory requires a Y-coordinate or row address and a position address within each row so that the frame memory knows where to store the count address produced by pixel counter 122 corresponding to each transition. This addressing function is performed by byte counter 126, line counter 128, and buffer 130. The line counter 128 is cleared by each vertical sync signal produced by the video timing circuit 109 and is incremented by each horizontal sync pulse produced by the video timing circuit 109, and delivers its count output to the buffer 130 for subsequent reading by the frame memory 118. The counts produced by the line counter 128 represent the rows $Y_0$ through $Y_{420}$ of FIG. 6. The byte counter 126 is cleared by each inverted horizontal sync pulse and incremented by each transition signal produced by the edge detector 116 and sent via OR gate 117 so that the byte counter 126 indicates in which position within each row of the matrix of FIG. 7 should the X-coordinate number produced by the pixel counter 122 be stored.

For example, if the video signal 112 is just beginning to translate information from the $Y_{n+3}$ row of pixels in the camera 82, the line counter 128 will have a count $Y_n+3$, the byte counter will have a county of 1, and the pixel counter will just begin to count up from zero. Then, when the pixel counter 122 has counted up to the number $X_e$, the edge detector will sense a transition and send a write signal to the frame memory 118 so that the number $X_e$ is written into the first position in the row $Y_{n+3}$ of the frame memory 118. A short time later, the video signal will indicate the black to white transition at X-coordinate location $X_d$ and the edge detector will send a write pulse toward the frame memory 118 and an increment signal to the byte counter 126. Approximately simultaneously, the pixel counter 122 will register an $X_d$ count on its output which, after a short delay defined by delay 127, is written in the second position in row $Y_{n+3}$ of the frame memory 118.

In the matrix of FIG. 7, there is also a zero entry within each row after the last non-zero X-coordinate entry, if any. The zero entry is made when the counter 122 is cleared by the inverted horizontal sync pulse which also inputs to an inverting gate 142 which triggers the write input 129 of the frame memory 118 via OR gate 117 and delay 127. This horizontal sync pulse also serves to increment the byte counter 126 which causes the zero entry to be written in a position in each row of the matrix of FIG. 7 after the last non-zero entry. A delay 131, slightly larger than delay 127, ensures that the byte counter 119 is not cleared until the zero entry is made in the appropriate position within the frame memory 118. Note that only the X-coordinate location information provided by the pixel counter 122 and the succeeding zero entries are actually stored in the frame memory 118, the $Y_n$ row numbers are not actually stored but nevertheless known to the computer because the X-coordinate information is stored in succeeding rows of a memory block within the frame memory 118 and the computer knows the address of the first such row in the memory block and references each row in relation to the first row.

After the computer generates the matrix of FIG. 7 corresponding to the portion of the line 14 displayed in FIG. 6, the computer proceeds to determine a center point CP-$P_n$ adjacent to a point $P_n$. Point $P_n$ is the center of the field 86 and the frame of FIG. 6, and if this frame were to be displayed on the monitor 34, the cursor 73 would indicate point $P_n$. To determine the coordinates of the center point adjacent point $P_n$, the computer calculates the length of a horizontal line 171 represented in broken form in FIG. 6 which divides the frame in half, in this case row $Y_i=210$, and passes through point $P_n$. To perform this calculation, the computer subtracts the X-coordinate number $X_f$ from the X-coordinate number $X_g$ stored in row $Y_i$ of the matrix 97 which indicate the X-coordinate position of the white to black transition in row $Y_i$ corresponding to one end point of said horizontal line and the black to white transition in the line $Y_i$ corresponding to the other end point of the horizontal line. Then, computer 22 determines the length of a vertical line 151 represented in broken form in FIG. 6 which passes through the point $P_n$ and terminates at the bounds of the line 14.

Figure 9:
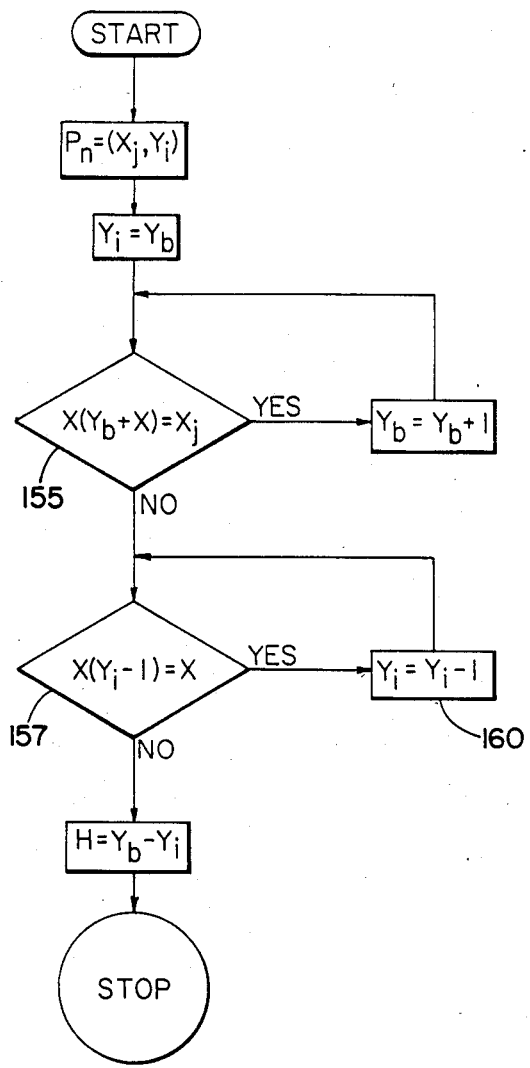
FIG. 9 is a flow chart of a process used in the line following system of FIG. 1 for determining the length of a vertical line which passes through a point on a line being followed and contained within the bounds of said line being followed.

FIG. 9 indicates an algorithm for determining the length of this line. First, a variable $Y_b$ is set to equal $Y_i$, the Y coordinate of the point $P_n$, the X coordinate equalling $X_i$. Next, as indicated by the triangle 155 the computer looks in a row $Y_b+1$ which is immediately beneath row $Y_i$ to see if there are two entries corresponding to a white to black transition and a black to white transition between which the point $X_i$ falls, and if so, this indicates that the vertical line 150 does not terminate in the row $Y_b+1$. In which case the computer then searches the second row beneath row $Y_i$ to see if there are entries corresponding to a white to black transition and a black to white transition between which the number $X_i$ falls and so on until the computer comes to the first row in which this condition is not satisfied, row $Y_i+3$ in the instant case. Then, as indicated by triangle 157 and rectangle 160 the computer begins to search the rows above row $Y_i$ in order allowing $Y_i$ to be incremented for each such row, and determines the row at which the line 150 terminates above the point $P_n$. In the case shown in FIG. 6, this upper row is $Y_i-1$, only one row above row $Y_i$. Finally, the computer determines the length of the line 151 by subtracting the final incremented value of $Y_i$ from the final incremented value of $Y_b$. Then, the computer determines the shorter of the vertical and horizontal lines and calculates the midpoint along the shorter line provided that the length of the shorter line is not much shorter than the standard thickness for the line 14, as previously calculated at the portion of the line 14 about the point P+1. To calculate the standard thickness, the computer 21 first calculated the length of a vertical line passing through point P+1 and bounded by the line 14 and then calculate the length of a horizontal line passing through point P+1 and bounded by the line 14 in the manner shown in FIG. 6 and described with reference to point P+1. Then, the computer determined a substantially precise thickness of the line 14 in the vicinity of point P+1 by the equation, $T = V \times H \sqrt{V^2 + H^2}$, where T equals thickness, V equals the length of the vertical line and H equals the length of the horizontal line.

If the shorter line through point $P_n$ is acceptable, its midpoint serves as the center point CP-$P_n$ adjacent point $P_n$ even though it may be only an approximate center point, and the coordinates of the deemed center point are stored by the computer, typically in a temporary memory first and later in a disc within disc unit 26 if the point is necessary to represent a small portion of the line 14 and not deleted in a subsequent line thinning operation. If, on the other hand, the shorter of the horizontal and vertical lines is too short, the computer may use the longer of the two lines if it is within a certain range of lengths relative to the standard thickness and compute the center point along this longer line for subsequent temporary storage and possibly more permanent storage in the disc memory unit 26.

Figure 10:
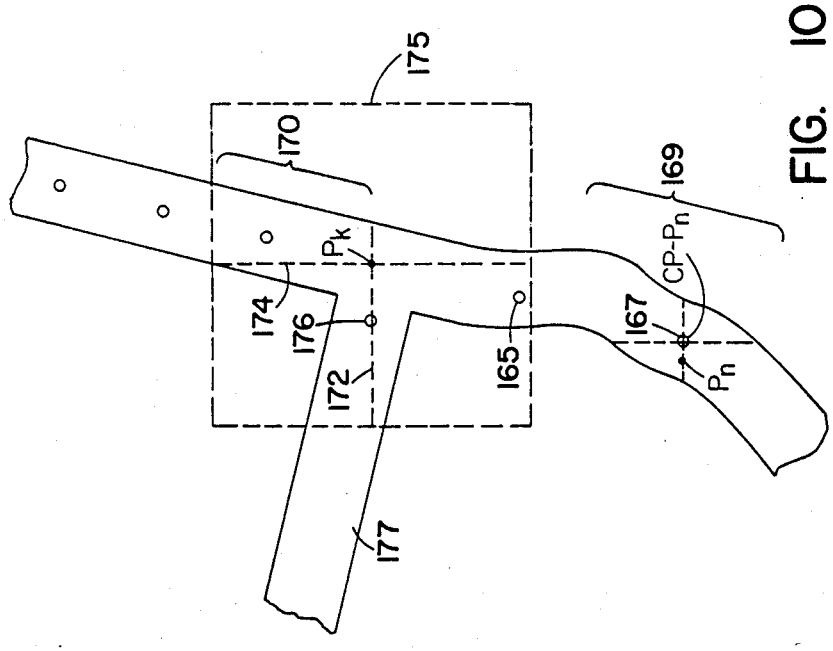
FIG. 10 is an illustration of a portion of a line being followed by the line following system of FIG. 1, and further illustrates selected points and associated center points on said line being followed, and indicates a process for determining said center points.

FIG. 10 illustrates a portion 169 of the line 14 shown in FIG. 6 and another portion or fork 170 of the line 14 contained within another frame 175 produced by the camera 82. The frame 175 is centered about a point $P_k$ whose location was determined by a vector between the previous two center points points 165 and 167 and the standard chord length, and the drawing illustrates two steps in a center point calculation process. As in the calculation of the center point adjacent $P_n$, the calculation of the center point adjacent $P_k$ begins when a matrix of the type shown is generated to represent the frame and the computer 22 determines the length of a horizontal line 172 which passes through the point $P_k$ and is confined within the line 14 and the length of a vertical line 174 which passes through the point $P_k$ and confined within line 14. However, when the computer discovers that each line has a length far greater than the standard line thickness, the computer will simply treat the point $P_k$ as the center point of the line 14 in that region and store the coordinates of point $P_k$ as representative of another small portion of the line 14. By way of example, the cut-off for acceptable line lengths of lines used in the center point calculation may be set at approximately one and one half times the standard line thickness. The reason that the computer 22 does not proceed to determine the center point of the shorter of the horizontal and vertical lines, in this case the line 172, is because this center point indicated at 176 is presumed to be further from the actual center point of the fork 170 of the line 14 than the point $P_k$. After treating point $P_k$ as a center point, the line following system 4 will proceed to follow fork 170 because a vector between point $P_k$ and the previous center point 165 aims that way. Thus, the center point calculation process and the searching process 81 referenced in FIG. 5, in addition to providing such center point calculations and searching functions, also assist the line following system 4 in choosing a line following direction at an intersection such as shown in FIG. 10.

After the computer scans the fork 170 and follows the line 14 to its end along this route, an operator, to digitize fork 177, can repeat the line following process indicated in FIG. 5, this time beginning with the fork 177 and proceeding away from the intersection of the forks 170 and 177.

Figure 12:
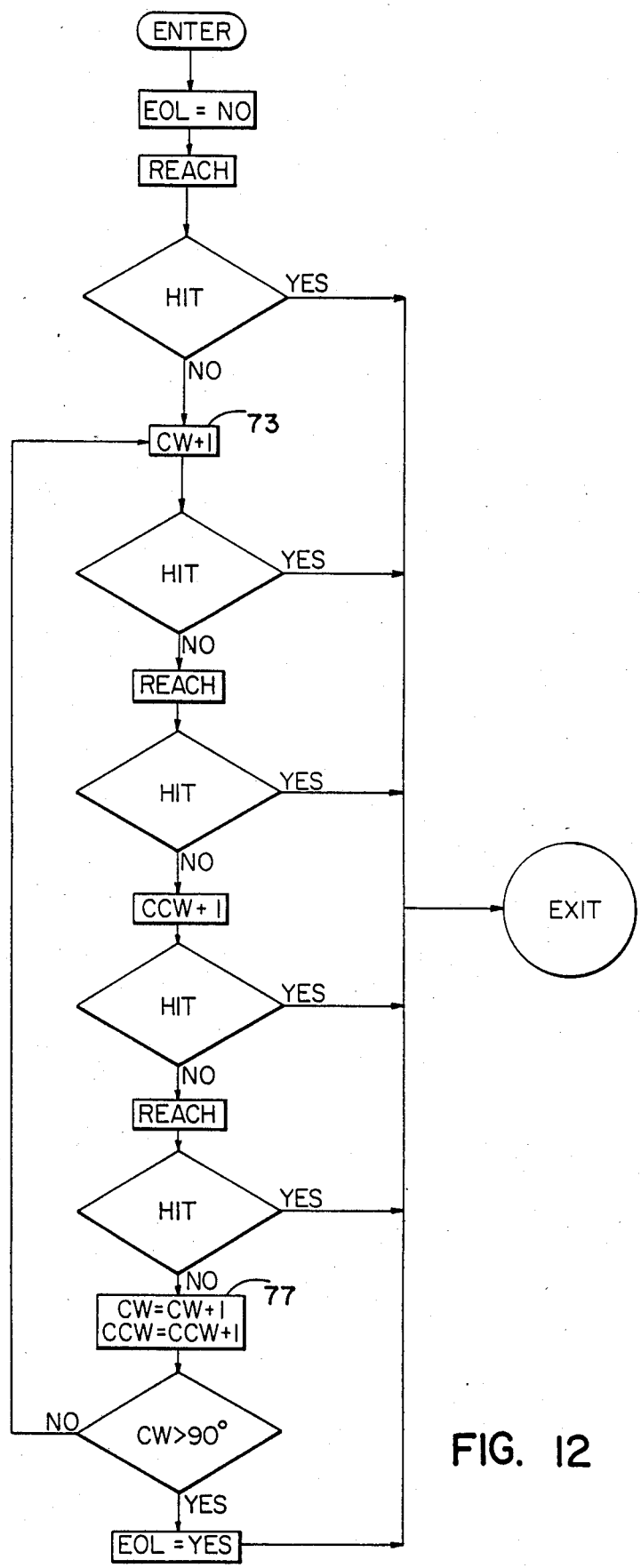
FIG. 12 is a flow chart illustrating a process used in the line following system of FIG. 1 for locating a point on a line being followed from another point located off the line.

FIG. 11 illustrates a portion 71 of the line 14 and together with FIG. 12 illustrate the process indicated in FIG. 5 by which the line following system 4 digitizes the portion 71 including an extremely curved segment 83. As discussed in reference to FIG. 1 and FIG. 4, an operator may manually select points P and P+1 by appropriately moving the joystick 68 and thumbwheel controls 60 and 62 and signal the computer to locate center points adjacent points P and P+1 by depressing the digitize button 64 on the console 30, this center point calculation being performed as illustrated in FIGS. 9 and 10. Next, the operator may press the vector advance button 66 on the console 30 to cause the scanning head 38 to automatically advance in a direction determined by a vector beginning at the center point adjacent point P and passing through a center point adjacent point P+1. When the scanning head 38 is centered over the point P+2 which is a distance equal to one standard chord length from the point P+1, a frame is generated and translated into a matrix of the type shown in FIG. 7 and the center point adjacent point P+2 is calculated in the manner described above. Then, the scanning head 38 is directed to pass over a point P+3 which is in the direction of the vector originating at the center point adjacent point P+1 and passing through the center point adjacent P+2 and spaced one standard cord length from the point P+2. Then, the computer determines a center point adjacent point P+3 in the manner described above and note, in this case, the center point is the midpoint of a vertical line passing through the point P+3 because the vertical line is shorter than the respective horizontal line.

Next, the computer advances the scanning head in the usual manner based on the vector between the center point adjacent point P+2 and the center point adjacent point P+3 and after one standard chord length the camera 82 passes directly over the point P+4. Note that the distance between the center point adjacent P+3 and the point P+4 and the distance between the center point adjacent point P+4$_6$ and a point P+5 have been increased in FIG. 11 for purposes of illustration but in the actual operation of the line following system 4, the distance between a projected point such as point P+4 and the center point adjacent point P+3 is the same as that between the point P+3 and the center point adjacent P+2, and that between the point P+5 and the center point adjacent P+4$_6$ and between each projected point P+N and a previous center point. After the camera 82 generates a frame of an image centered about point P+4, the frame-grabber 107 creates a matrix of the type shown in FIG. 7, then the computer 22 reviews the entries in the middle horizontal line in the matrix and realizes that the X-coordinate of point P+4, assumed to be the X-coordinate of the midpoint of the matrix, number 125 in a 250 column matrix, is not between a white to black transition entry and a next succeeding black to white transition entry. Consequently, the computer learns that the point P+4 does not fall on or hit the line 14. Then the computer conducts a search process illustrated by the step 81 in FIG. 5 as well as the entire FIG. 12 which begins when the computer looks a short distance beyond the point P+4 to a point P+4$_1$, which is in a direction indicated by a vector 261, the one emanating from the previous two center points which was used to determine the point P+4. This step is also refered to as a "reach" in FIG. 12 and a standard reaching distance between point P+4 and P+4$_1$ may, by way of example, equal 0.7 times the standard thickness of the line as previously determined. The precise reaching distance is not critical to the searching process but should be less than the standard thickness or actual thickness of the line 14 in the vicinity of the point P+4 so that a particular reach cannot jump over the line in the event that the line passes beyond and adjacent point P+4 and perpendicular to the vector 261.

After the first reach the computer, by reviewing the matrix in the manner described above senses that the point P+4$_1$ does not fall on the line either, and as indicated by a step 73 locates a point P+4$_2$ which is a standard arc length in the clockwise direction from the point P+4. The standard arc length corresponds to a separation distance between the points P+4 and P+4$_2$ equal to approximately the reaching distance. When the computer senses that the point P+4$_2$ does not fall on the line 14, the computer reaches beyond P+4$_2$ one standard reaching distance in a direction indicated by a vector 255 between the center point adjacent point P+3 and point P+4$_2$ to the point P+4$_3$, and when the computer senses that the point P+4$_3$ does not hit the line 14, the computer as indicated by a step 75, searches one standard arc length in the counterclockwise direction from the point P+4 to a point P+4$_4$ to see if it hits the line 14. When the computer senses that the point P+4$_4$ does not hit the line, it reaches to a point P+4$_5$ and when it senses that the point P+4$_5$ also fails to hit the line, the computer determines whether it has so far scanned a 90 degree arc from the point P+4 in both directions because that indicates the bounds of the field represented by the matrix of FIG. 7, and in the present searching operation the points P+4$_1$ through P+4$_5$ span less than a 90 degree arc from point P+4. Consequently, the computer as indicated by a step 77 and the step 73, searches two standard arc lengths in the clockwise direction from point P+4 and locates point P+4$_6$. Then, the computer senses that the point P+4$_6$ hits the line 14 and proceeds to calculate the center point adjacent the point $P+4_6$ in the normal manner illustrated in FIG. 10. To sense that the point $P+4_6$ hits the line 14, the computer first calculates the X-Y coordinates of the point $P+4_6$ from a knowledge of the position of point $P+4_6$ relative to point $P+4$, the center point of the matrix. Then the computer reviews the Y-row in the matrix of the point $P+4_6$ to see if there is a white to black entry and a next succeeding black to white entry which spans the X-coordinate of the point $P+4_6$. In this case this is to indicate a hit.

Since the line following system 4 has not yet reached the end of the line, the computer then switches back to the standard vector advance mode whereby the computer directs the scanning head 38 to move in a direction determined by a vector originating at the center point adjacent point $P+3$ and passing through the center point adjacent point $P+4_6$ and at a distance equal to the standard chord length, the camera 82 passes directly over a point $P+5$. The point $P+5$ also does not hit the line 14 so the computer again performs the searching process illustrated in FIG. 12 and ultimately determines the center point adjacent point $P+5_6$.

As shown in FIG. 11, the line 14 has made nearly a 90 degree turn in the segment 83 between the points $P+3$ and the center point adjacent point $P+5_6$ and this sharp turn caused projected points $P+4$ and $P+5$ to be well off the line. But, nevertheless, the scanning head 38 has continued to follow the line 14 around this sharp turn and locate center points, and the next point selected in the vector advance mode, $P+6$, falls on the line and no searching operation is required, only a standard center point calculation such as illustrated in FIG. 10.

Figure 13:
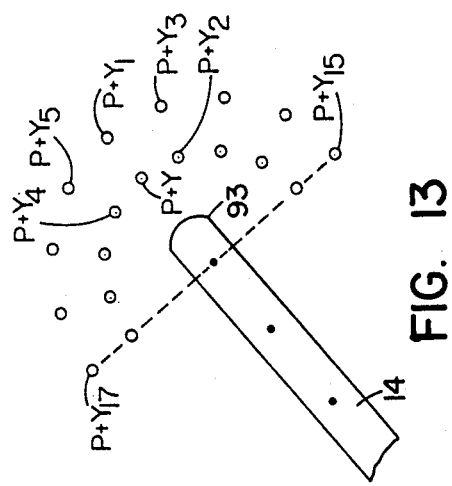
FIG. 13 is an illustration of an end of a line being followed and a searching process performed by the line following system of FIG. 1 for ascertaining that an optical scanning device has reached the end of the line.

The vector advance process continues until the scanning head 38 reaches a point $P+Y$ beyond an end 93 of the line 14 as illustrated in FIG. 13, the computer jumps into the searching algorithm illustrated in FIG. 12. However, unlike the results of the searching operation performed about points $P+4$ and $P+5$, the computer searches points $P+Y_1$ through $P+Y_{17}$ which span 90 degrees in both directions from point $P+4$ and does not locate a point which hits the line 14. Consequently, the computer assumes that it has reached the end of the line 14, stops the motion of the scanning head 38 and asks the operator what to do next. In the illustration of FIG. 13, it has been shown that there are seventeen points which have been searched about point $P+Y$, however, this particular number is intended only as an illustration of the angular bounds of the searching field and not intended to indicate that exactly seventeen points must be searched within a total of 180 degrees in an arc centered about a point such as $P+Y$ in order to determine that scanning head 13 has reached the end of the line.

FIG. 14 illustrates the motion of the scanning head 38 as it follows the line 14 along the portion of the line shown in FIG. 11. Since the scanning head 38 was directed, by way of illustration, manually from point P to point $P+1$, the course of movement of the scanning head 38 between these two points is variable and not of particular significance and is indicated generally by a dotted line 131. Then, after the computer determines the coordinates of the projected point $P+2$, it plots a course for the scanning head 38 so that the camera 82 will eventually pass over point $P+2$. Because point $P+1$ was manually selected, the scanning head 38 is in a resting position while the computer plots the course to point $P+2$ and may proceed directly to a point where the scanning head 38 will make a turn, in a first embodiment of the invention, a point such as $P+2-'$ which precedes the next projected point such as point $P+2$. Point $P+2-'$ and point $P+2$ are approximately in the direction of a vector which originates at the center point adjacent point P and passes through the center point adjacent point $P+1$, and it is intended by this course of movement of the camera 82 that when the scanning head passes through the point $P+2$ it is traveling approximately in the direction of said vector and at a predetermined speed. Since the scanning head 38 was at a resting position over point $P+1$, it must accelerate to a certain speed and decelerates to a lesser speed, the lesser speed may be near or equal to zero at the point $P+2-1$ where the scanning head 38 changes course to aim approximately straight towards point $P+2$ in the direction of the vector between the center point adjacent point P and the center point adjacent point $P+1$, the scanning head 38 again experiencing an acceleration. The rate of acceleration from the points $P+1$ and $P+2-'$ is limited by the inertia of the scanning head 38 and other associated moving parts and the rate of deceleration prior to point $P+2-'$ where the scanning head 38 turns is also limited by the inertia of the scanning head, and the deceleration must be sufficient so that the scanning head 38 can negotiate the turn, the sharper the turning or breaking angle, the more nearly the scanning head 38 must decelerate to zero velocity before turning. After the camera 82 passes over the point $P+2$ and the frame-grabber generates a matrix of the type shown in FIG. 7 centered about the region of point $P+2$, the computer calculates the center point adjacent point $P+2$ and senses that this center point is not the same as point $P+2$ and therefore, the camera 82 is not traveling in the proper direction to pass directly over the next projected point $P+3$.

The computer directs the movement of the scanning head 38 by sending command signals to a plotter controller and interpolator 134 shown in FIG. 15 which in turn sends corresponding signals to a buffer 136 which interfaces to the X-Y motors 50 and 52. Also, the computer receives information as to the position of the scanning head 38 from position sensors 56 and 58. In the process of directing the motion of the scanning head 38, the computer sends to the plotter controller and interpolator 134 information as to coordinates of points through which the computer desires the scanning head to pass and the plotter controller calculates each prior or succeeding superscripted point such as points $P+2-'$, $P+2'$ and $P+2''$ along with desired angles and speeds which the computer desires the scanning head to exhibit when passing through each projected point. Then, the plotter controller and interpolator 134 generates a series of pulses which it sends to the X-Y motors 50 and 52 which, for purposes of illustration, are of the stepping variety, and the frequency and total number of the pulses sent to the X motor determines the X component of velocity and the frequency and total number of pulses sent to the Y motor determines the Y component of velocity, both components being necessary to move the scanning head 38 in the desired manner. For a further discussion of principles of accelerating and decelerating a head such as may be used in a plotting or line following system so the head can follow a desired course, reference may be made to U.S. Pat. No. 3,512,066 to Gerber which issued May 12, 1970, and is assigned to the assignee of the present invention, and is hereby incorporated by reference as part of the present disclosure.

By the time the computer completes its frame-grabbing operation and calculation of a center point adjacent point P+2, the vector between the center point adjacent point P+1 and the center point adjacent point P+2 and the location of a projected point P+3, the scanning head has already passed point P+2 by a distance delta and the camera 82 has advanced to a point P+2' along the route of the vector between the center point adjacent point P and the center point adjacent point P+1. Then, the computer sends data as to the coordinates of the next projected point, P+3, and the desired angle and speed at which the scanning head should pass through point P+3 to the plotter controller and interpolator 134. It is not necessary that the computer send this information to the plotter controller and interpolator 134 as soon as it is calculated, although this may be desirable, and instead, the computer can wait any length of time after it passes through any projected point before sending the course change information to the plotter controller and interpolator 134. Once the computer sends the course change information to plotter controller and interpolator 134 it takes a short time for the plotter controller and interpolator to process the information, send an appropriate signal to the buffer 136, and for the appropriate signal to filter through the buffer 136 and effect the X motor 50 and Y motor 52. Also, it takes a short time for the scanning head 38 to decelerate once it receives this new appropriate signal so that it can negotiate the necessary turn, and the time it takes the scanning head to sufficiently decelerate to its turning speed from the time that the computer sends the course change information to the plotter controller and interpolator 134 is indicated by a time delta prime and the turning begins at a point P+2''. From the point P+2'', the scanning head is directed in a generally straight line to a point P+3−' and experiences an acceleration to a certain velocity and then a deceleration to slow or if necessary stop the scanning head at the point P+3-' so that it can negotiate the necessary turn and cause the camera 82 to pass directly over the point P+3 at a desired angle and speed.

Referring again to the previous case, when the camera 82 passes over point P+3 and a frame frozen and a matrix generated, the computer will again sense that the scanning head 38 is not aimed toward a projected point P+4, and will correct its course by following solid lines 279 and 281 in a manner analogous to the way it was corrected near point P+2. After passing over point P+4 the motion of the scanning head is indicated by solid lines 283, 285, 287, 289 and 291. By this time, scanning head 38 has followed the rather sharp curve shown in FIG. 14 and approaches a point P+7 where the line 14 straightens out. During this linear portion of the 14 beyond this point P+7, the scanning head 38 also follows a linear course and needs no course changes. During linear portions of the line 14 and other lines which are followed at other times the process illustrated in FIG. 14 for routing the scanning head 38 is especially advantageous because this routing process allows the scanning head 38 to proceed relatively rapidly along line 14 without stopping at projected points because these projected points are actually center points.

By way of example and comparison, if in a modified version of the line following system 4, the scanning head 38 was directed to stop at each point P+N and stalled there while a projected point P+N+1 was calculated and a course plotted unlike the case illustrated in FIG. 14 where the scanning head continues past each point $P_n$ while these computations are made, when the modified system follows a straight line such as the latter portion of the line 14 illustrated in FIG. 14, the scanning head will stop at each point P+N and consequently provide a slower rate of line following speed than the process illustrated in FIG. 14. Note, that this modified system for directing the course of movement of a scanning head such as head 38 may be implemented by utilizing the line following system 4 with appropriate modifications to take advantage of the other features of the invention illustrated in FIG. 14.

In a second embodiment of the invention, the point P+3−' as well as point P+2−' and all other negatively superscripted point preceeding a projected point are coincident with the adjacent projected point in which case the turning or breaking angle at the points P+2−'/P+2, P+3−'/P+3, P+4−'/P+4 and P+5−'/P+5 will be less in this case than in the first embodiment where the negatively primed points preceed the projected points. In this case where the negatively superscripted points are coincident with adjacent projected point, the course of motion of the camera 82 between each double primed turning point and a subsequent projected point is indicated by broken lines 273, 275, 277, and 279, the rest of the motion of the camera 82 being the same as in the first embodiment except that the scanning head 38 in the second embodiment of the invention stops momentarily or at least slows considerably at each projected point such as points P+2, P+3, etc. so that the scanning head 38 can negotiate the requisite turn. However, in the second embodiment, the scanning head usually does not wait at any projected points while course change information is calculated. So, for example, after momentarily stopping at point P+3, the scanning head 38 in the second embodiment quickly proceeds along the route identified by solid lines 297 and 299 before turning at point P+3'' and proceeding along the route identified by the broken line 277.

FIG. 16 illustrates a thinning process utilized by the line following system 4 to decrease or "thin" the number of digitized points, usually center points, which are permanently stored by the computer 22 to represent the line 14. In FIG. 16, all the points P+20 through P+25 are center points along a portion of the line 14 and they were calculated in the order indicated in the normal manner described above. After the coordinates of each point are calculated, the following process is followed to determine if the previous point is necessary to adequately define the surrounding portion of the line 14. Assuming that the point P+22 was just calculated and the point P+20 has survived a previous thinning operation, the computer then determines angles relative to another line such as a horizontal one of a line 371 which originates at the point P+20 and forms a tangent to a circle 370 centered about the point P+22, and of another line 373 originating at the point P+20 and forming a tangent to the circle 370 opposite the other tangent. The computer 22 also computes the angles of lines 372 and 374 centered at the point P+20 and tangent to a circle 376. The radius of each circle shown in FIG. 16, including circles 370 and 376 corresponds to a tolerance level selected by an operator to establish the maximum deviation tolerable from a given center point to a line connecting two other center points which precede and succeed the given center point, the smaller the radius of the circles, the lesser the tolerance and the closer that a given point must be near such a line before its coordinate can be deleted from the memory of the computer 22 as unnecessary to represent the portion of the line 14 surrounding these three points.

To continue the thinning operation, the computer next determines if there is any angle within the sector defined by the lines 372 and 374 which coincides with or overlaps the angles defined by the lines 371 and 373, and if so, the point P+21 is not necessary to represent the line and may be deleted from memory. Next, the computer calculates the coordinates of a point P+23 in the normal manner illustrated in FIG. 5 and determines the angles of tangents 378 and 380 which both emanated from point P+20 and whether any angle contained therein overlaps any angle contained within previously overlapping tangents 371, 373, and if so, as is the case in FIG. 16, deletes the point P+22. Next, the computer calculates the coordinates of a point P+24 and the angles of tangents 382 and 384, and compares these angles to the angles contained within the tangents 378 and 380 and since there is no overlap between the two groups of angles, point P+23 is saved to represent the contour of a surrounding portion of the line 14. Next, the computer calculates the angles of tangents 386 and 388 which emanate from the point P+23, and calculates the coordinates of a point P+25 and the angles of tangents 390 and 392 to determine if the point P+24 is necessary. The point P+24 is not necessary to represent line 14 and may be deleted from memory because the angles within tangents 380 and 388 overlap the angles within tangents 390 and 392.

The tangents 386, 388, 390, and 392 demonstrate a scheme of the thinning process when it is finally determined that a given point such as point P+23 is necessary to represent the contour of the line 14. The scheme is that the tangents to a subsequent pair of circles around associated center points such as points P+24 and P+25 emanate from the given necessary point and tangents to still subsequent circles around associated center points will also emanate from the given necessary point until a subsequent necessary point has been located. Then, that subsequent necessary point serves as the origin for subsequent tangents to subsequent circles around associated center points.

A line following system 4 can also be operated in a semi-automatic mode also referred to as a single step mode whereby an operator begins in the normal fashion by selecting two points such as the points P and P+1 which are displayed on the monitor 34 and, in a normal manner, the computer 22 calculates the center points adjacent them and directs the scanning head 38 to proceed towards the point P+2. However, in this single step mode, the computer waits at point P+2 for the operator to select another point on the line 14 which need not be along the vector between the two previous center points. Once the operator selects the given point the computer calculates an adjacent center point and directs the scanning head 38 to proceed one standard chord length to a projected point determined by the vector between the center point adjacent the given point and the previous center point. This mode of operation may be used to direct the following of a complicated portion of a line such as a region of multiple intersections and can be implemented by the aforedescribed electronic hardware and mechanical parts and by software which can readily be designed from that which is disclosed above. For example, a suitable computer program may be based on the flow chart of FIG. 5 wherein step 204 is modified to increment a given point two counts instead of one as in the aforedescribed process of FIG. 5, and from step 204 the computer is directed to step 206 wherein an operator may manually select the next point to be digitized instead of to the next automatic vector advance step indicated by step 208.

By the foregoing, a line following system embodying the present invention has been described. However, numerous modifications and substitutions can be made without deviating from the spirit of the invention. For example, there are other ways for a computer to decide which way to direct an optical scanning head at an intersection other than the one indicated by the standard searching process illustrated in FIGS. 5 and 12. For example, as illustrated in FIG. 18, the computer 22 can remember each horizontal line passing through each center point which it previously calculated in the process of locating each center point, and where as indicated in FIG. 18 by points P+44−' and P+44−2, the scanning head has advanced one chord length beyond the point P+3, the computer 22 calculates a horizontal line through points P+44−' and P+44−2. Then, by means of a matrix of the kind shown in FIG. 7, the computer recognizes that there are two lines in the corresponding row of the matrix which include X-coordinates common to those contained in the horizontal line passing through point P+43. At this time, the computer can stop the scanning head and wait for a signal from an operator to choose whether the scanning head should continue along the vector defined by points P+43 and P+44−1 or defined by the points P+43 and P+44−2, or the computer can be preprogrammed to bear right or left at such an intersection or, if the situation arises, go straight through an intersection. Accordingly, the invention has been described by way of illustration rather than limitation.

We claim:

1. A line following system comprising:
   a matrix generating optical scanner for scanning a portion of a line on a plotting surface and generating matrix entries representing points in a two dimensional view of said portion, said two dimensions being defined by said plotting surface, and
   first computer means for determining a relative course of movement between said optical scanning device and said line based at least in part on two dimensional information derived from said matrix entries, said relative course of movement leading said optical scanning device to scan an adjacent portion of said line.

2. The line following system defined in claim 1 further comprising:
   thresholding means for translating said matrix entries into two-level matrix entries, and
   said computer means utilizing said two-level matrix in determining said relative course of movement.

3. The line following system defined in claim 1 further comprising:
   a video camera and a video monitor for viewing said portion of the line scanned by said optical scanning device.

4. The line following system defined in claim 1 further comprising a controller for manually directing said optical scanning device to move relative to said plotting surface to cause said optical scanner to scan a desired portion of said line.

5. The system defined in claim 1 further comprising second computer means for determining the coordinates of a point on said portion of the line.

6. The line following system defined in claim 5 further comprising:
 a video monitor for imaging said portion of the line being scanned by said optical scanner and
 a graph controller for superimposing a representation of said point on an image produced by said video monitor of a respective portion of the line being scanned.

7. The system defined in claim 5 wherein said point on said portion of the line is an approximate center point on said portion of the line relative to the thickness of said portion of the line.

8. A process for following a line inscribed on a plotting surface, said process comprising the steps of:
 optically scanning a first area on said plotting surface containing a first portion of said line and generating a first matrix representation of said first area,
 optically scanning a second area on said plotting surface containing an adjacent, second portion of said line and generating a second matrix representation of said second area,
 determining from said first matrix a first point associated with said first portion of said line,
 determining from said second matrix a second point associated with said second portion of said line,
 defining a vector between said first and second points, and
 optically scanned a third area on said plotting surface, said third area being spaced some distance from said first and second areas in the general direction of said vector and located along a line segment intersecting said first and second points.

9. The process defined in claim 8 wherein
 said first point is located on said first portion of said line, and
 said second point is located on said second portion of said line.

10. The process defined in claim 9 further comprising the steps of
 determining from said first point an adjacent, approximate midpoint in the thickness of said first portion of said line, and
 determining from said second point an adjacent, approximate midpoint in the thickness of said second portion of said line.

11. The process defined in claim 9 further comprising the step of
 generating a third matrix representation of said third area.

12. The process defined in claim 11 wherein:
 said third area contains a third portion of said line, and further comprises the steps of
 determining from said third matrix a third point on said third portion of said line, and
 determining whether said first, second and third points are sufficiently aligned so that said second point is not needed to digitize said line.

13. The process defined in claim 12 wherein the step of determining whether said first, second and third points are sufficiently aligned so that said second point is not needed to digitize said line comprises the steps of
 computing a representation of a line passing in the vicinity of said first and second points,
 computing a representation of a line passing in the vicinity of said second and third points, and
 analyzing the angle between the two computed lines to determine whether said first, second, and third points are sufficiently aligned so that said second point is not needed to digitize said line.

14. The process defined in claim 13 wherein said line passing in the vicinity of said first and second points intersects said first and second points.

15. The process defined in claim 14 wherein said line passing in the vicinity of said second and third points intersects said second and third points.

16. The process defined in claim 10 wherein the step of determining an approximate midpoint adjacent to said first point comprises the steps of:
 calculating the length of a straight line segment which passes through said first point and is bounded by said line being followed, and
 calculating an approximate midpoint of said line segment.

17. The process defined in claim 10 wherein the step of determining an approximate midpoint adjacent to said first point comprises the steps of:
 calculating the length of a first straight line segment which passes through said first point and is bounded by said line being followed,
 calculating the length of a second straight line segment which passes through said first point and is bounded by said line being followed, said second line segment being substantially angularly displaced relative to said first line segment, and
 calculating an approximate midpoint of the shorter of said first and second line segments.

18. The process set forth in claim 9 further comprising the steps of:
 selecting a third point in said third area, adjacent to the line, and in the general direction of said vector,
 selecting a fourth point at a predetermined displacement from said third point, and
 determining whether said fourth point is on the line.

19. The process defined in claim 18 wherein said fourth point is off said line and further comprising the steps of:
 selecting a fifth point at a different, predetermined displacement from said third point and
 determining whether said fifth point is on the line.

20. A process for following a line as set forth in claim 11 further comprising the steps of
 determining from said third matrix a third point on said line,
 optically scanning past said second area in the direction of said vector,
 determining a second direction of scanning which leads to said third point on said line, said determination performed at least in part while scanning past said second portion of said line, and
 scanning in said second direction.

21. The process defined in claim 20 wherein said first direction of scanning past said portion of said line is that of a vector which intersects at least two previously located points on said line.

22. The method defined in claim 20 further comprising the step of calculating the location of projected point on said line, and wherein said course of scanning leads to said projected point.

23. The process defined in claim 8 wherein said first area overlaps said second area.

24. In a method used to follow a line, the steps of:
 determining two points on the line,
 calculating a vector starting at one of said two points and passing through the other of said two points, projecting a point spaced from the other of said two points generally in the direction of said vector, determining whether said projected point falls on said line, and if said projected point does fall on said line, locating a point adjacent said projected point, said adjacent point being more centered than said projected point in relation to the thickness of said line.

25. A method for following a line on a plotting surface, said method comprising the steps of:

generating a matrix representation of a two dimensional view of a region of said plotting surface containing a portion of said line, determining the location of a point on said portion of said line based on information contained in said matrix, generating a matrix representation of another region of said plotting surface containing a portion of said line, determining the location of another point on said line based on information contained in said matrix of said other region, and calculating the location of still another region on said plotting surface containing another portion of said line based at least in part on the location of said determined points, said other region being calculated to be in a direction approximately defined by a vector intersecting said determined points, and at a predetermined distance from one of said determined points.

26. In a method used to follow a line the steps of:

determining two points on the line, calcualting a vector starting at one of said two points and passing through the other of said two points, projecting a first point spaced from the other of said two points generally in the direction of said vector, determining whether said first projected point falls on said line, if said first projected point does not fall on said line, projecting a second point spaced from the other of said two points generally in the direction of said vector by a distance greater than that of the first projected point, and determining whether said second projected point falls on said line.

27. The method defined in claim 26 further including the step of:

if said second projected point does not fall on said line, projecting a third point at the same distance from said other point as said first projected point but located to one side of said vector, and determining whether said third projected point falls on said line.

28. The method defined in claim 27 further including the step of:

if said third projected point does not fall on said line, projecting a fourth point spaced from the other of said two points by the same distance as said first projected point but located to the other side of said vector, and determining whether said fourth projected point falls on said line.

* * * * *